Feb. 28, 1961 E. H. HARTEL 2,973,168
LANDING GEAR
Filed Aug. 27, 1957 2 Sheets-Sheet 1

INVENTOR.
ERWIN H. HARTEL
BY
ATTORNEY

Feb. 28, 1961 E. H. HARTEL 2,973,168
LANDING GEAR
Filed Aug. 27, 1957 2 Sheets-Sheet 2

INVENTOR.
ERWIN H. HARTEL
BY
ATTORNEY

United States Patent Office 2,973,168
Patented Feb. 28, 1961

2,973,168

LANDING GEAR

Erwin H. Hartel, Cleveland, Ohio, assignor to Cleveland Pneumatic Industries, Inc., a corporation of Ohio Filed Aug. 27, 1957, Ser. No. 680,569

4 Claims. (Cl. 244—104)

This invention relates generally to landing gears and more particularly to a non-scuffing laterally extending landing gear adapted to be mounted on an aircraft fuselage.

In helicopters there is no wing on which the landing gear can be mounted so it is necessary to use struts which are mounted on the fuselage and extend laterally to provide sufficient wheel tread. With such a structure, wherein the strut is inclined downward away from the fuselage, any flexing of the free end of the strut produces lateral movement of the landing wheel and side scuffing of the tire unless special means are provided to eliminate the lateral motion. This is particularly troublesome in helicopters wherein rotor rotation produces rather severe vertical vibration of the aircraft which vibrations can introduce lateral scuffing of the landing wheel.

It is an important object of this invention to provide a new and improved non-scuffing landing gear adapted to be mounted on the fuselage of an aircraft.

It is another important object of this invention to provide a new and improved landing gear structure wherein the landing gear is adapted to be mounted on the fuselage of an aircraft and extend in an inclined manner therefrom in combination with means to eliminate lateral movement of the landing wheel.

It is still another object of this invention to provide a landing gear incorporating inclined laterally extending flexible struts which are allowed to flex under the operating loads on the landing gear in combination with a fluid spring mounted on the strut in a manner to eliminate side scuffing of the landing wheel.

Further objects and advantages will appear from the following descriptions and drawings, wherein Figure 1 is a perspective view of a landing gear according to this invention mounted on a helicopter;

Figure 1:
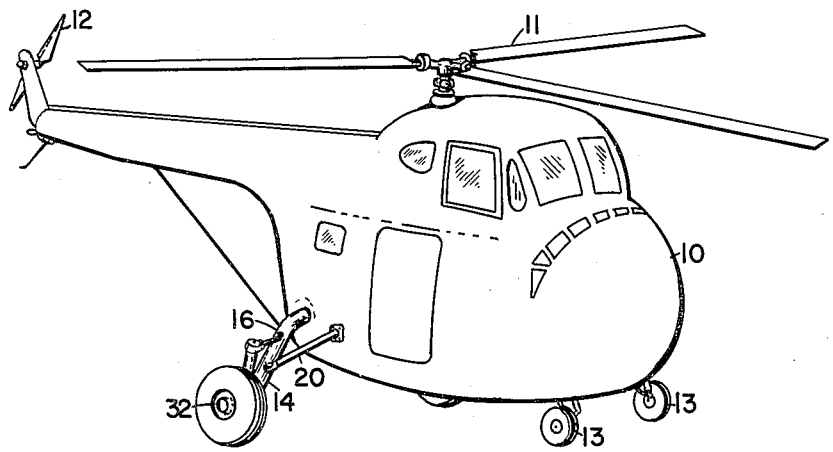
Figure 2:
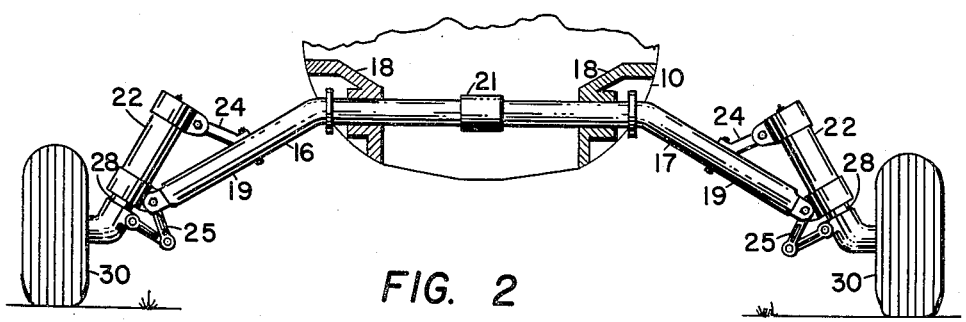
Figure 2 is a fragmentary view partially in section showing the landing gear structure according to this invention and the means utilized to mount it on the helicopter.

In Figure 1 the preferred landing gear according to this invention is shown as it would be used in conjunction with the helicopter having a fuselage 10, a main rotor 11 and an anti-torque tail rotor 12. The helicopter itself forms no part of this invention excepting insofar as its co-operation with the preferred landing gear and is merely shown as landing gear environment. The helicopter is supported on the ground by a pair of castering nose wheels 13 and a main landing gear 14 according to this invention.

The main landing gear 14 includes opposed struts 16 and 17 extending from the two sides of the fuselage 10. The two struts 16 and 17 extend through two spaced frame bearings 18 in the fuselage 10 and are connected by a connecting collar 21. The collar joins the two struts and in effect makes them a unitary member which can be mounted on only two bearings so it is not necessary to provide two bearings for each of the struts 16 and 17.

The two bearings 18 prevent movement of the inner ends of the struts 16 and 17 in all directions except rotation around the axis of the bearings. To prevent such rotation a drag link 20 is connected between the fuselage 10 and each of the struts as shown in Figure 1. The drag link 20 therefore co-operates with the bearings to provide a mounting wherein the inner ends of the struts 16 and 17 are rigidly connected to the fuselage 10 and restrained against any movement relative thereto.

Two landing gears are similar so only one will be discussed in detail with the understanding that the discussion applies equally to the other. The strut 16 extends through one of the bearings 18 and has an inclined portion 19 which extends downwardly and laterally away from the fuselage 10. The inclined portion 19 is stressed in a manner so that it will flex under normal operating loads from the unstressed position of Figure 3 to the loaded position of Figure 4. This bending which is illustrated by the displacement of the full line position of Figure 4 from the dotted or phantom position causes the free end 21 of the strut 16 to move horizontally through a distance $x$ as the strut 16 bends under landing loads. In effect the free end 21 moves along a locus which approaches an arc having a center adjacent to the associated bearing 18. Because the free end is inclined downwardly away from the fuselage 10 the locus of the free end 21 is inclined upwardly away from the fuselage 10. If a landing wheel were to be mounted directly on the free end 21 vertical movement of the fuselage would cause the wheel to be scuffed sideways through the distance $x$ and would produce excessive wear.

To prevent tire scuffing and absorb part of the landing impact a fluid spring is mounted on the free end 21 with a cylinder 22 bolted at its lower end to the free end 21 by a bolt fastener 23 and laterally supported at its upper end by a stabilizing bar 24 bolted at its ends to the cylinder 22 and the strut 16 by bolt fasteners 26 and 27 respectively. The cylinder 22 is provided with a bore into which projects a co-operating piston 28 that is axially movable relative to the cylinder 22 along a line of action 29. The piston 28 and the cylinder 22 co-operate in the normal way to form a fluid spring wherein fluid is compressed between the piston and cylinder and urges the piston 28 downwardly relative to the cylinder 22. In order to prevent relative rotation between the piston 28 and the cylinder 22 around the line of action 29 a pair of conventional torque arms 25 are provided which operate to prevent relative rotation between the piston and cylinder while permitting relative axial movement therebetween. The lower end of this piston 28 is formed with a laterally extending axle spindle 31 on which is journaled a landing wheel 32 and tire 30 having a bottom portion 35 engageable with the ground.

As mentioned previously, if the wheel 32 were mounted directly on the free end 21 of the strut 16 the application of a vertical load would cause the wheel 32 to move horizontally or laterally through the distance $x$ and would cause scuffing of the tire. In order to prevent such scuffing while still permitting the use of a flexible strut 16 I arrange the line of action 29 so it is inclined upwardly and inwardly relative to the fuselage 10. As a vertical load is applied to the wheel 32 the piston 28 moves upwardly relative to the cylinder 22 along the line of action 29 compressing the spring. Since the line of action 29 is inclined relative to the vertical, such compressive movement causes the piston 28 and wheel 32 to move horizontally to the right relative to the cylinder 22. The various elements are arranged so that the horizontal movement of the piston 28 relative to the cylinder 22 for any given load has substantially the same magnitude and is in the opposite direction as the horizontal movement of the free end 21. Therefore, the two horizontal movements canceled out and the wheel 32 moves in a vertical plane under the influence of vertical loads applied thereto. In other words the bending of the strut 16 produces movement of the cylinder 22 which has a horizontal component in a direction away from the fuselage 10. At the same time the compression of the fluid spring causes the piston 88 to move relative to the cylinder 22 along the line of action 29 which movement has a horizontal component in a direction toward the fuselage 10. Since the cylinder 22 moves with a horizontal component away from the fuselage 10 and since the landing wheel 32 moves relative to the cylinder 22 with a horizontal component toward the fuselage 10 the two horizontal components subtract and if the magnitudes are the same or substantially the same there will be substantially no horizontal movement of the landing wheel 32 relative to the fuselage 10 and therefore no scuffing. Because the tire 30 has some lateral flexibility any small amount of lateral movement of the wheel 32 which may occur can be tolerated without producing scuffing. Since the spring rate of the struts 16 and 17 are constant within the operating range and since the spring rates of the fluid springs are sufficiently constant the horizontal component of motion produced by the fluid spring will be substantially equal to the horizontal movement caused by bending of the strut throughout the entire operating range.

Figure 3:
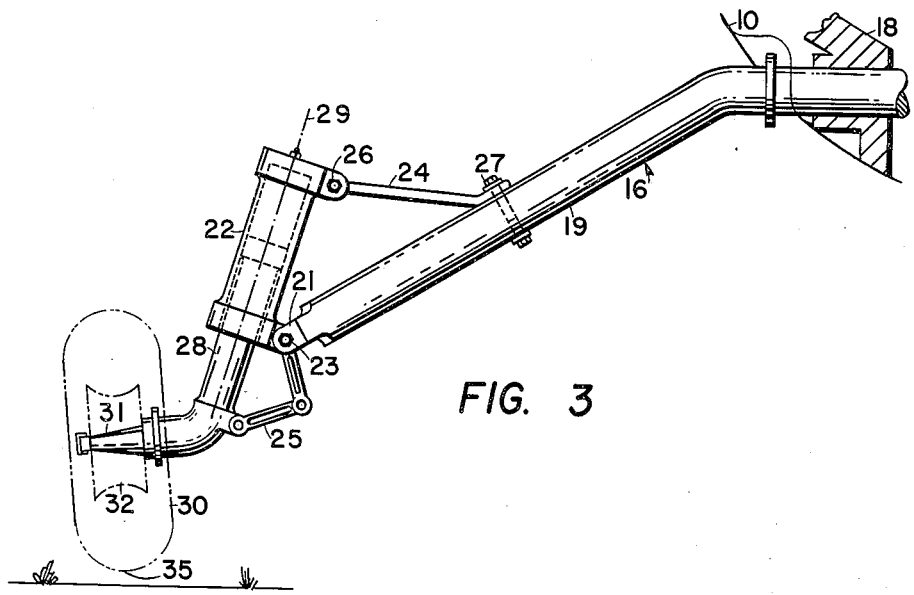
Figure 3 is an enlarged fragmentary side elevation showing the positions of the elements of the landing gear when it is in the extended position prior to landing.
Figure 4:
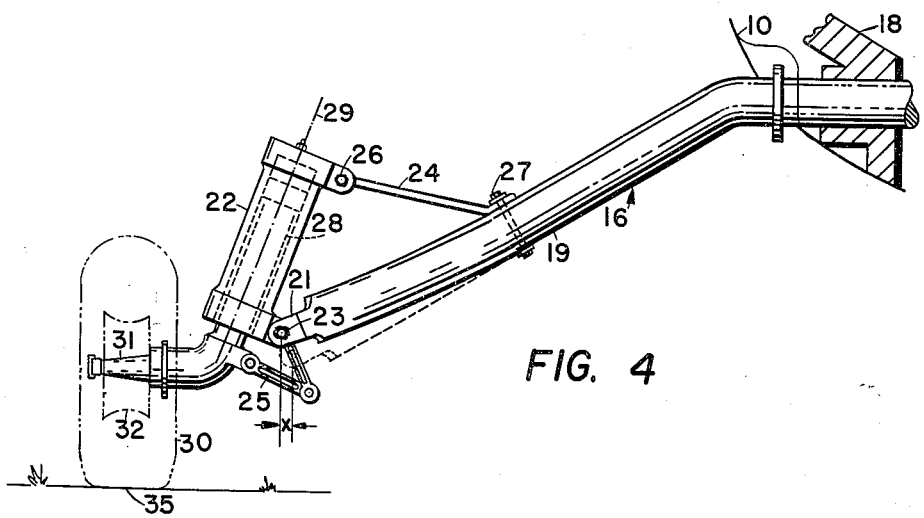
Figure 4 is a view similar to Figure 3 showing the position the elements assumed when the landing gear is supporting the weight of the aircraft on the ground.

It should be noted that the wheel 30 is slightly tipped in Figure 3 and is vertical in Figure 4 due to the flexing of the strut 16. By arranging the elements so that the wheel is vertical in the loaded condition the strains on the tire are minimized. Again since the bottom portion 35 is the critical section in scuffing it is this portion of the wheel which is considered in the determination of the angle of inclination of the cylinder 22.

A lighter weight landing gear is produced by utilizing the structure described because it permits the use of light weight flexible strut 16 and a smaller fluid spring. In the past it has been customary to mount the fluid spring in a vertical position and reinforce the strut 16 so that the free end 21 will not move under load. This has increased the weight of the strut and required the fluid spring to be designed to accommodate the full stroke of the landing gear. In the landing gear according to this invention the bending of the strut 16 is utilized to provide some of the stroke of the landing gear and the shorter fluid spring can therefore be used.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description is determinative of the scope of the invention.

I claim:

1. In combination an aircraft having a frame, an elongated flexible strut secured at one end to said frame extending laterally and downwardly therefrom to an outer end, support means connected to said outer end, a ground engaging element carried by said support means for movement along an axis inclined inwardly toward said frame and having a bottom portion adapted to engage the ground upon operation of the aircraft on the ground, said strut and element being subjected to vertical forces upon such operation of the aircraft on the ground effecting flexing of said strut and the resulting lateral movement of said outer end with respect to the frame in one direction and movement of said element along said inclined axis and its resulting lateral movement with respect to said outer end in an opposite direction.

2. In combination an aircraft having a frame, an elongated flexible strut secured at one end to said frame extending laterally and downwardly therefrom to an outer end, support means connected to said outer end, a ground engaging element carried by said support means for movement along an axis inwardly inclined toward said frame and having a bottom portion adapted to engage the ground upon operation of the aircraft on the ground, said strut and element being subjected to vertical forces upon such operation of the aircraft on the ground effecting flexing of said strut and the resulting lateral outward movement of said outer end with respect to the frame and movement of said element along said inclined axis and its resulting lateral inward movement with respect to said outer end.

3. In combination an aircraft having a frame, an elongated flexible strut secured at one end to said frame extending laterally and downwardly therefrom to an outer end, support means connected to said outer end, a ground engaging element carried by said support means for movement along an axis inwardly inclined toward said frame and having a bottom portion adapted to engage the ground upon operation of the aircraft on the ground, said outer end and element being subjected to vertical forces upon such operation of the aircraft on the ground effecting bending of said strut and lateral outward movement of said outer end with respect to the frame and movement of said element along said inclined axis and its resulting lateral inward movement with respect to said outer end.

4. In combination, an aircraft having a frame, a downwardly inclined elongated strut fixed at its inner end to said frame, said strut being flexible under certain conditions of operation, the flexing of said strut causing its outer end to move horizontally away from said inner end, a fluid spring including co-operating cylinder and piston elements movable relative to each other along a center axis during compression and extension of said spring, means securing one of said elements to said outer end with said center axis inclined inwardly toward said frame, and a ground engaging wheel on the other of said elements movable therewith along said center axis, the inclination of said center axis causing the ground engaging portion of said wheel to move horizontally towards said inner end during the compression of said spring.

References Cited in the file of this patent

UNITED STATES PATENTS 2,691,496    Katzenberger            Oct. 12, 1954